United States Patent
Michigami et al.

(10) Patent No.: US 6,388,343 B1
(45) Date of Patent: May 14, 2002

(54) POWER SUPPLY UNIT AND ELECTRONIC APPARATUS FOR PREVENTING A LEAK CURRENT

(75) Inventors: Toru Michigami, Fujisawa; Yukifumi Nakazawa, Ebina; Arimasa Naitoh, Fujisawa, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/030,343

(22) Filed: Feb. 25, 1998

(30) Foreign Application Priority Data

Feb. 26, 1997 (JP) .............................................. 9-042255

(51) Int. Cl.[7] .................................................. H02J 7/00
(52) U.S. Cl. ...................................... 307/112; 307/139
(58) Field of Search ................................... 307/112, 113, 307/126, 139, 130, 131

(56) References Cited

U.S. PATENT DOCUMENTS

| | | | | |
|---|---|---|---|---|
| 4,044,286 A | * | 8/1977 | Adams et al. | 318/297 |
| 4,381,459 A | * | 4/1983 | Cotton | 307/139 |
| 4,533,810 A | * | 8/1985 | Hameron | 219/10.55 B |
| 4,538,074 A | * | 8/1985 | Fraden | 307/126 |
| 4,613,327 A | * | 9/1986 | Tegrarian et al. | 604/141 |
| 4,931,607 A | * | 6/1990 | Berger | 200/524 |
| 5,079,785 A | * | 1/1992 | Garcia | 5/431 |
| 5,574,319 A | * | 11/1996 | Bennett | 307/114 |

* cited by examiner

Primary Examiner—Fritz Fleming
(74) Attorney, Agent, or Firm—Ronald L. Drumheller (57) ABSTRACT

A leak current is prevented from flowing during a power off state in a power supply unit having a remote power on/off function by using the momentary switch. In a state of power off, i.e. a state in which a switch SW2 is turned off, power is not applied to a latch circuit 30, and hence power is not consumed. A switch drive circuit 40 does not consume power. When a user depresses a momentary switch SW1 during a state that the switch SW2 is turned off, the switch drive circuit 40 turns the switch SW2 on. As a result, the latch circuit 30 can receive a drive voltage $V_{CC}$ from a node located down stream of the switch SW2, so that it can store or latch the turn on state of the momentary switch SW1. After that, when the user releases the momentary switch SW1, it returns to an original position and operation of the switch drive circuit 40 which turns the switch SW2 on is terminated. However, at this point of time, it becomes possible to maintain the turn on state of the switch SW2 by the operation of the latch circuit 40.

6 Claims, 6 Drawing Sheets

US 6,388,343 B1

POWER SUPPLY UNIT AND ELECTRONIC APPARATUS FOR PREVENTING A LEAK CURRENT

BACKGROUND OF THE INVENTION

1. Field of the Invention

The present invention relates to a power supply unit and an electronic apparatus using the power supply unit. More particularly, the present invention relates to a power supply unit using a momentary type power switch and an electronic apparatus using the power supply unit. More particularly, the present invention pertains to a power supply unit realizing a remote power on/off scheme using the momentary switch and an electronic apparatus unit using the power supply unit.

2. Related Art

Figure 5:
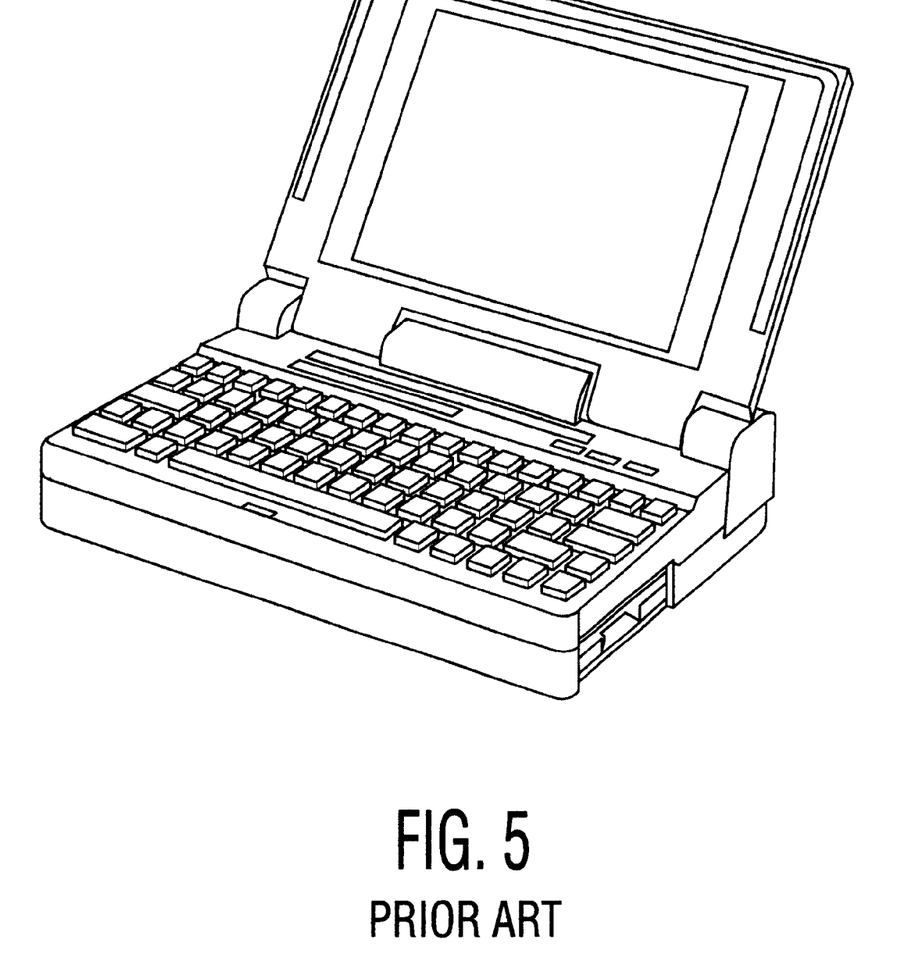
FIG. 5 shows a perspective view of the notebook PC.

Due to a recent technical revolution, various small size and light weight electrical and electronic apparatuses with an excellent mobility, a notebook personal computer (PC) for example, have been developed. Among them, the notebook PC is designed and fabricated to be small size and light weight with taking consideration of a mobile environment, i.e. use in outdoor requiring portability and mobility. One example of the notebook PC is "IBM ThinkPad 760" series marketed by IBM Japan, Ltd (The "ThinkPad" is a trademark of International Business Machines Corporation). The ThinkPad 760 is a clam shell structure which contains a thin main body and a cover member pivotally mounted to about rear edge of the main body, as shown in the FIG. 5. A system board on which a CPU, a memory and various controller chips are mounted is contained within the main body. Also, a hard disk drive (HDD), a floppy disk drive (FDD), and a CD-ROM drive etc., as external storage device, are accommodated into the main body. Also, a key board unit as an input device is mounted on an upper surface of the main body. A liquid crystal display (LCD) unit is embedded within the cover member. An operator can perform a key input with seeing the LCD unit by opening the clam shell cover member. Also, by closing the clam shell cover member, the key board unit and the LCD unit are protectively placed within the personal computer for carrying it. Generally, the notebook PC is a battery powered type which is driven by the battery, since the PC is designed to use it in the mobile environment where a commercial power supply is not available.

Recently, a remote on/off scheme using a momentary type (return type) switch has been frequently used as the power supply on /off circuit scheme of these electronic apparatuses. For example, the above described notebook PC "ThinkPad" series uses the momentary switch as the power switch, to enable the control of the power on/off by a single hand.

Figure 6:
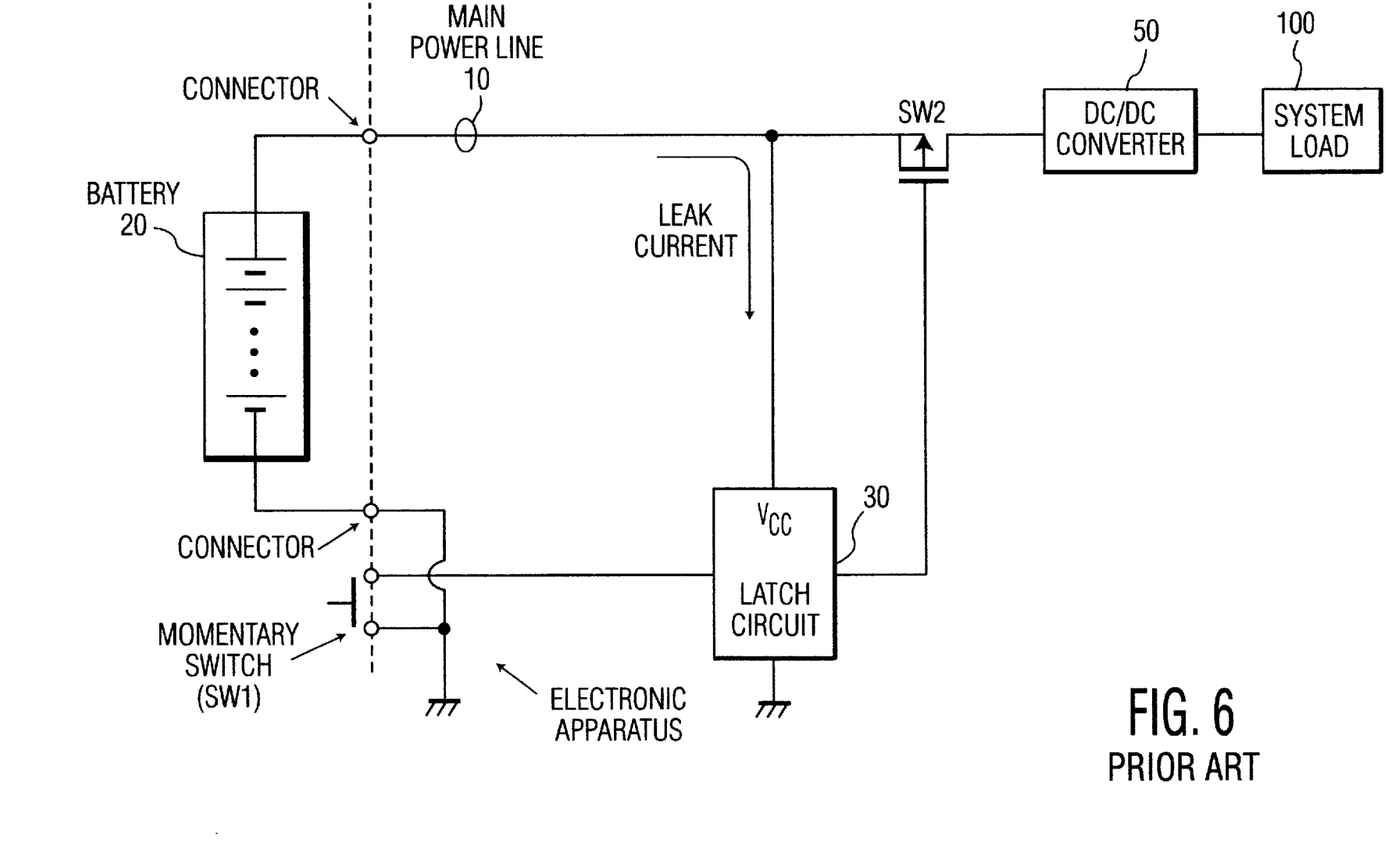
FIG. 6 shows a block diagram of constitution of a conventional power supply system using a momentary switch.

The FIG. 6 shows a block diagram of major parts of the on/off mechanism of a conventional power supply system using the momentary switch. As shown in the FIG. 6, a main power source of the electronic apparatus is a battery 20, and the battery 20 is detachably and exchangeably connected through a connector. An output current of the battery 20 is supplied to a DC/DC converter 50 through a main power line 10. The DC/DC converter 50 converts the DC voltage of the battery 20 to a level suitable for a system operation, and supplies it to various portions of a system load. A switch SW2 is inserted on the way of the main power line 10 to turn on/off the output of the main power source. An example of the switch SW2 is a P channel type FET switch.

A power switch (SW1) by which an user can indicate the power on/off of the apparatus is mounted on a surface of an outer wall of a housing of the electronic apparatus. If this power switch SW1 is the momentary switch, the switch SW1 returns to the original position when the user manipulation is terminated. Because the switch SW1 stays at the same position, the switch SW1 itself can not store the current manipulated state, i.e. the power on state or the power off state. To one end of the switch SW1, a latch circuit 30 is connected which stores the current manipulated state of the momentary switch SWI, and the on/off control of the switch SW2 is performed by the output of the latch circuit 30 rather than the direct output of the momentary switch SW1. To be brief, the power on/off operation of the electronic apparatus is remotely made by the latch circuit rather than made directly by the momentary switch SW1.

The latch circuit 30 requires a drive voltage. In the example shown in the FIG. 6, the latch circuit 30 is applied with a drive voltage $V_{CC}$ from the main power line 10. Even when the electronic apparatus is powered off, the drive voltage $V_{CC}$ is required to store the manipulated state of the momentary switch SW1. Therefore, the drive voltage $V_{CC}$ must be supplied from a node located at the upper stream, i.e. a source side, of the switch SW2, which is always powered even when the switch SW2 is turned off, rather than a node located at the down stream, i.e. a drain side, of the switch SW2, which is powered off when the SW2 is turned off. However, it means that a leak current continuously flows through the latch circuit 30 even when the apparatus is powered off, and that the supply of the drive voltage $V_{CC}$ causes an undesired power consumption. In the case that the electronic apparatus is a battery powered type, the leak current flowing from the battery during a long power off period of the electronic apparatus can not be ignored.

Particularly, a requirement has been recently increased to ship the electronic apparatus from a factory with the battery being accommodated into a battery room within the PC body. It is because a user wants to operate the PC at the time he or she opens the package to display system set up instructions on the display unit (it is called as "Instant On") so that the usability is increased, and because a space in the package for packaging the battery becomes unnecessary thereby saving the costs. However, in the case that a delivery period from the factory to users exceeds several months, the over discharge of the battery may arise due to the leak current to the latch circuit as above described. The over discharge may causes the degradation of the characteristic of the battery, resulting in the increase of the claims by the users.

SUMMARY OF THE INVENTION

The object of the present invention is to provide an excellent electronic apparatus and a power supply unit used into the electronic apparatus which eliminate a leak current during a power off period.

The further object of the present invention is to provide an excellent electronic apparatus and a power supply unit used into the electronic apparatus which use a momentary type power switch.

The further object of the present invention is to provide an electronic apparatus and a power supply unit used into the electronic apparatus which realize a remote power on/off scheme using the momentary switch without a leak of current at a power off period.

Figure 1:
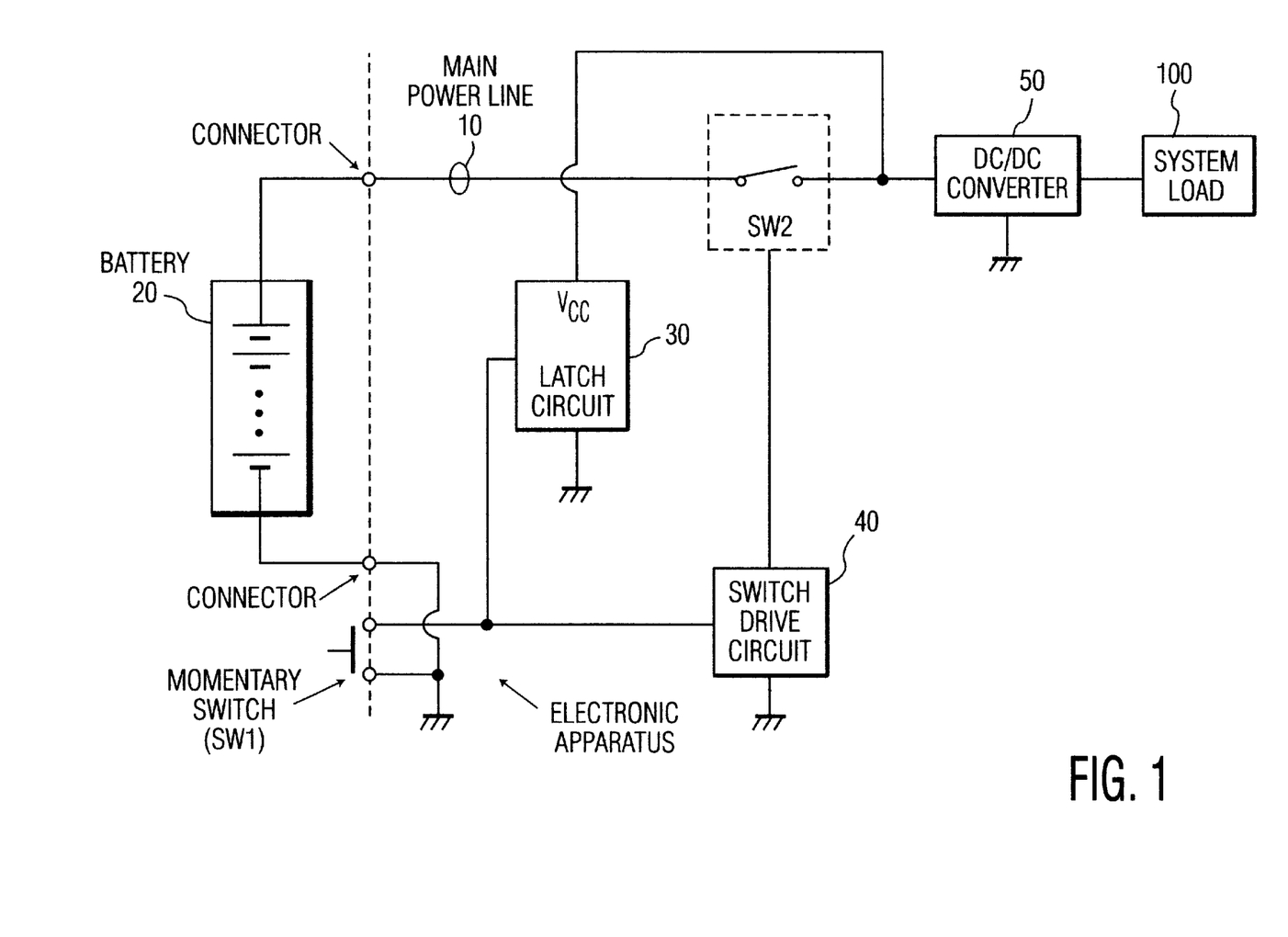
FIG. 1 shows a block diagram of constitution of a power supply system embodying the present invention.

The operation of the present invention is described with reference to the FIG. 1. The FIG. 1 schematically shows the power supply unit operated in the remote power on/off scheme which embodies the present invention.

The electronic apparatus containing the power supply unit uses a battery 20 as a main power source, and the battery 20 is detachably and exchangeably connected at a connector portion. An output current of the battery 20 is supplied to a DC/DC converter 50 through a main power line 10. It is substantially the same as that of the prior circuit shown in the FIG. 6 that the DC voltage from the battery 20 is converted to a voltage level by the DC/DC converter 50 and the voltage level is applied to the various portions of a system load 100, and that a switch (SW2) for turning on/off the output of the main power supply is connected on the way of the main power line 10. The switch SW2 may be a P channel type FET, for example.

A momentary switch (SW1) by which an user controls the power on/off of the electronic apparatus is mounted on a surface of an outer wall of the electronic apparatus. One terminal of the momentary switch SW1 is inputted to the latch circuit 30 and a switch drive circuit 40, and the other terminal of the momentary switch SW1 is connected to a ground potential. The latch circuit 30 is provided to store the current manipulated state of the momentary switch SW1. Since a drive voltage $V_{CC}$ of the latch circuit 30 is applied from a node located at the down stream, i.e. a drain side, of the switch SW2, the power to the latch circuit 30 is not supplied when the switch SW2 is turned off, and hence the latch circuit 30 can not latch the manipulated state of the momentary switch SW1. The switch drive circuit 40 turns the switch SW2 on in response to the operation of the momentary switch SW1 in the turn off state of the switch SW2. More particularly, when the P channel FET switch SW2 is in the turn off state, the switch drive circuit 40 connects a gate terminal of the P channel FET switch SW2 to the ground potential in response to the operation of the momentary switch SW1. The switch drive circuit 40 does not consume power in the turn off state of the switch SW2 (i.e. the turn off state of the power supply unit), and can turn the switch SW2 on in the non-powered state (i.e. the state in which the drive voltage is not supplied), in the manner as described.

The power on operation in the power supply system proceeds as below. In the power off state i.e. the state in which switch SW2 is turned off, the power is not consumed since the power is not supplied to the latch circuit 30. Also, at this point of time, the switch drive circuit 40 does not consume the power. When the user depresses the switch SW1 during the turn off state of the switch SW2, the switch drive circuit 40 turns the switch SW2 on. As a result, the latch circuit 30 becomes possible to receive the drive voltage $V_{CC}$ from the node located at the down stream of the switch SW2, becomes possible to latch the turn on state of the momentary switch SW1. After this, when the user releases the momentary switch SW1, the momentary switch SW1 itself immediately returns to its original position, so that the turn on operation of the switch SW2 by the switch drive circuit 40 is terminated. However, at this point of time, it becomes possible to maintain the turn on state of the switch SW2 by the operation of the latch circuit 30.

When the system is in the power off state, i.e. the state in which the switch SW2 is turned off, the power is not supplied to the latch circuit 30. Also, since the switch drive circuit 40 does not require any drive voltage to turn the switch SW2 on, the power loss does not arise even if the system is not used during a long period. Accordingly, even if the electronic apparatus with the battery is not used during a long period, the power loss of the battery due to the leak current does not arise.

In summary, in accordance with the present invention, it is possible to provide an excellent electronic apparatus and a power supply unit used in the electronic apparatus which eliminate a leak current during a power off period.

Also, in accordance with the present invention, it is possible to provide an excellent electronic apparatus and a power supply unit used in the electronic apparatus which use a momentary type power switch.

Also, in accordance with the present invention, it is possible to provide an electronic apparatus and a power supply unit used in the electronic apparatus which realize a remote power on/off scheme using the momentary switch without a leak of current during a power off.

Further objects, characteristics and advantages of the present invention will be apparent from the detail description based upon the embodiments of the present invention and the drawings.

DESCRIPTION OF THE PREFERRED EMBODIMENTS

The present invention will be described in detail hereinbelow.

A. Constitution of Power Supply System

Figure 2:
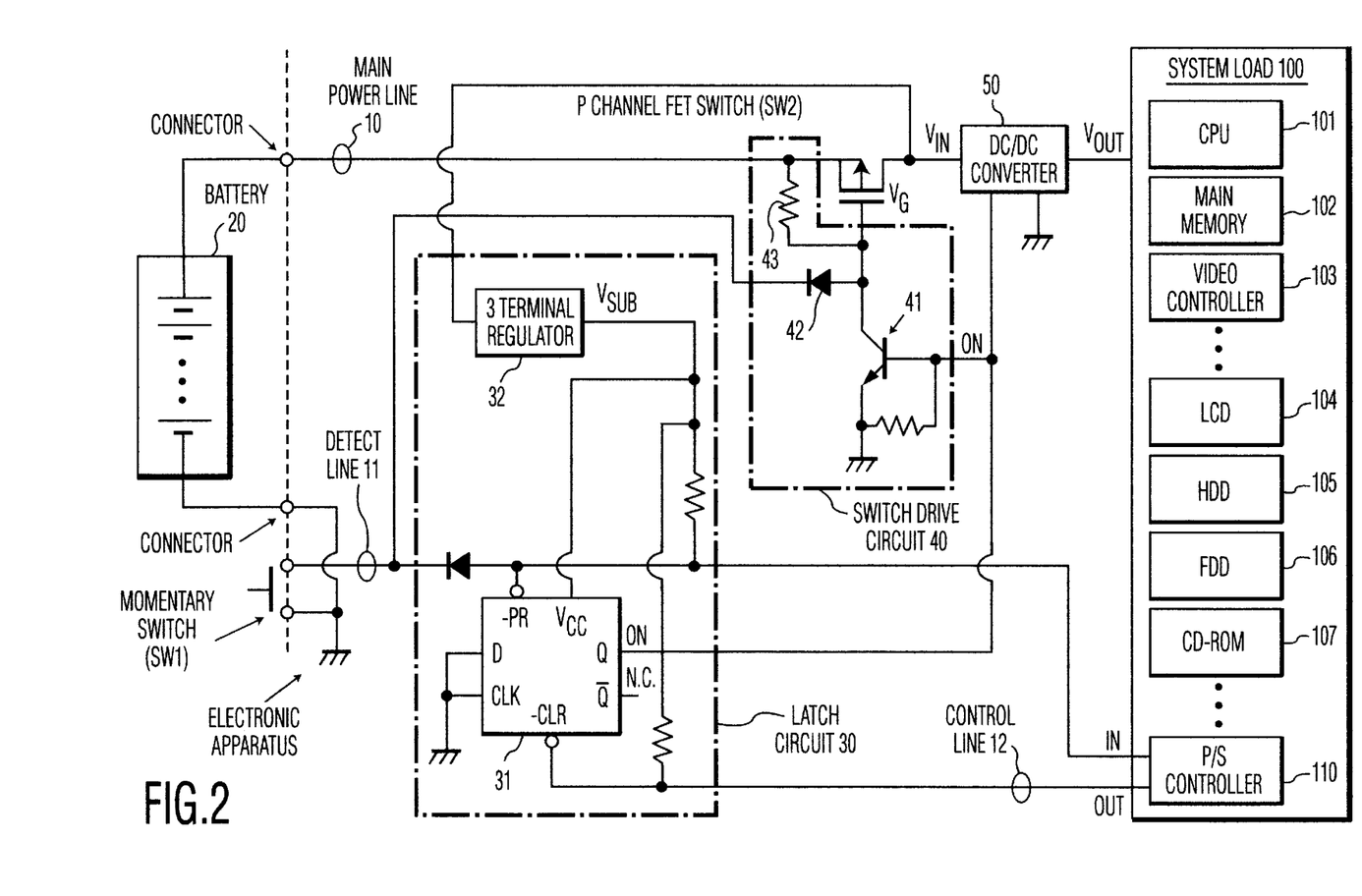
FIG. 2 shows in detail the power supply system embodying the present invention.

The FIG. 2 shows the detail of the constitution of the power supply unit of the remote power on/off scheme embodying the present invention. This power supply system is used in the notebook PC, and contains a battery 20, a DC/DC converter 50, a main power line 10 connecting an output terminal of the battery 20 with an input terminal of the DC/DC converter 50, switches SW1 and SW2 operating as a power switch, a latch circuit 30 and a switch drive circuit 40. Detail of each component is described hereinbelow.

The battery 20 is one of the main power sources of the notebook PC, in the form of a package in which a plurality of rechargeable battery cells, such as Lithium Ion (Li-Ion) battery, Nickel Metal Hydride (NiMH) etc., are connected. This battery 20 is detachably and exchangeably connected at a connector portion.

The output current of the battery 20 is supplied to the DC/DC converter 50 through the main power line 10. The DC/DC converter 50 converts the DC voltage outputted from the battery 20 to a stabilized voltage level suitable to the operation of the PC system. The output voltage $V_{OUT}$ of the DC/DC converter 50 is distributed to various portions of the system load 100.

The system load 100 contains CPU 101, a main memory 102, various peripheral controller chips including a video controller 103, a liquid crystal display (LCD) 104 operating as an output device, a hard disk drive (HDD) 105 operating as an external memory device, a floppy disk drive (FDD) 106, CD-ROM drive 107 and a power source controller 110, etc.

The CPU 101 is a main controller for controlling an entire operation of the PC system 100 under the control of operating system (OS), and uses the main memory 102 as a working area. The programs and data required for the operation are loaded to the main memory 102 from the external memory device 105, etc. The drive of the peripheral devices are performed by the peripheral controller. For example, an image display for the LCD is performed by the video controller 103, and an input/output operation with a modem and a printer is performed by an I/O controller, not shown.

The power source controller 110 is a controller chip for supporting the power on/off operation of the PC system 100. For example, when the power source controller 110 detects the power off operation by the momentary switch SW1, it executes the close process at a firmware level. Also, the power source controller 110 controls the charge and discharge operation of the battery 20. One chip controller "300/H8" of Hitachi, Ltd. for example, can be programmed to perform the function of the power source controller.

It is noted that many other electrical circuits than the circuits shown in FIG. 2 are required to construct the PC, but they are not shown since they are well known in the art and they do not constitute the present invention.

The switch SW2 for turning the output of the main power source on or off is inserted on the way of the main power line 50 which connects the output of the battery 20 with the DC/DC converter 50. In the exemplary embodiment, a P channel type FET is used as the switch SW2.

The momentary switch SW1 is used to remotely turn the switch SW2 on or off, and mounted on the outer wall of the housing of the electronic apparatus. That is, a user can indicate the turn on or the turn off of the notebook PC by manipulating the switch SW1. One end of the momentary switch SW1 is inputted to the latch circuit 30, the switch drive circuit 40 and an input terminal IN of the power supply controller 110 as a detect line 11, respectively. Since the other end of the momentary switch SW1 is connected to the ground potential, the detect line 11 is connected to the ground potential or a low level voltage during the depress of the switch SW1.

The latch circuit 30 is a circuit group for sequentially memorizing the current manipulated state of the momentary switch SW1, and contains a D flip flop 31 as a memory element. The inverted detect line 11 of the momentary switch SW1 is inputted to a preset terminal "-PR" of the D flip flop 31, and the inverted output OUT (i.e. a control line 12) of the power source controller 110 is inputted to a clear terminal "-CLR" of the flip flop 31. The Q output of the D flip flop 31 is the ON signal and is used to enable the DC/DC converter 50 and to turn a transistor 41 on, as stated below. The drive signal of the latch circuit 30 is supplied from a node $V_{IN}$ located at the down stream (i.e. the drain side) of the P-channel FET switch SW2. Three terminal type regulator 32 receives the input voltage $V_{IN}$ and generates a stabilized sub power source voltage $V_{SUB}$, and applies it to the voltage terminal $V_{CC}$ of the D flip flop 31. Also, the output terminal $V_{SUB}$ of the three terminal type regulator 32 is coupled to the detect line 11 and the control line 12 to pull up the lines 11 and 12.

Since the voltage $V_{CC}$ of the D flip flop 31 is retrieved from the node located at the down stream (i.e. the drain side) of the switch SW2, the D flip flop 31 is not driven during the turn off state of the switch SW2 (i,e, during the turn off state of the power supply system), irrespective of the input level of the preset terminal "-PR" and the clear terminal "-CLR", that is, the latch circuit 30 can not latch the manipulated state of the momentary switch SW1. On the other hand, the D flip flop 31 driven by the voltage source voltage $V_{CC}$ activates the Q output in response to the turn on operation of the momentary switch SW1 (i.e. the inverted signal of the ground level inputted to the preset terminal "-PR"). The D flip flop 31 deactivates the Q output in response to the fact that the power supply controller 110 deactivates its own output OUT.

The switch drive circuit 40 is provided to turn the switch SW2 on in response to the depression of the momentary switch SW1 by user while the switch SW2 is in the turn off state, that is, in the condition that the latch circuit 30 can not be driven. As shown in the FIG. 2, the switch drive circuit 40 contains a transistor 41, a diode 42 and a resistor 43. In the exemplary embodiment, the transistor 41 is a NPN transistor, its emitter terminal is connected to the ground potential, its collector terminal is connected to a gate terminal $V_G$ of the P channel type FET switch SW2, and its base terminal receives the Q output of the D flip flop 31. An anode terminal of the diode 42 is connected to the gate terminal $V_G$ of the FET switch SW2 along with the collector terminal of the transistor 41, and a cathode terminal is connected to the detect line 11. The resistor 43 is connected between the source terminal and the gate terminal $V_G$ of the FET switch SW2.

When the power supply system is in the power off state, the Q output of the D flip flop is deactivated, and hence the transistor 41 is turned off. In this condition, the gate terminal $V_G$ of the P channel FET switch SW2 is applied with the voltage of the source electrode, i.e. the output voltage of the battery 20 through the resistor 43, so that the switch SW2 is turned off. In this condition, when the momentary switch SW1 is depressed, the end of the detect line 11 is connected to the ground potential through the momentary switch SW1, so that the gate terminal $V_G$ of the FET switch SW2 is connected to the ground potential through the diode 42, and the switch SW2 is turned on. When the switch SW2 is turned on, the drive of the latch circuit 30 is started, and the Q output of the D flip flop 31 is activated. The detail of these operation is latter described. It should be fully understood, at this stage, that the switch drive circuit 40 can turn the FET switch SW2 on without any drive voltage.

B. Operation of Power Supply System

The hardware structure of the power supply system of the present invention was described in the former column. In this column, the operation and the effect of the power supply system of the present invention are described with reference to the FIGS. 3 and 4.

Power On Operation

Figure 3:
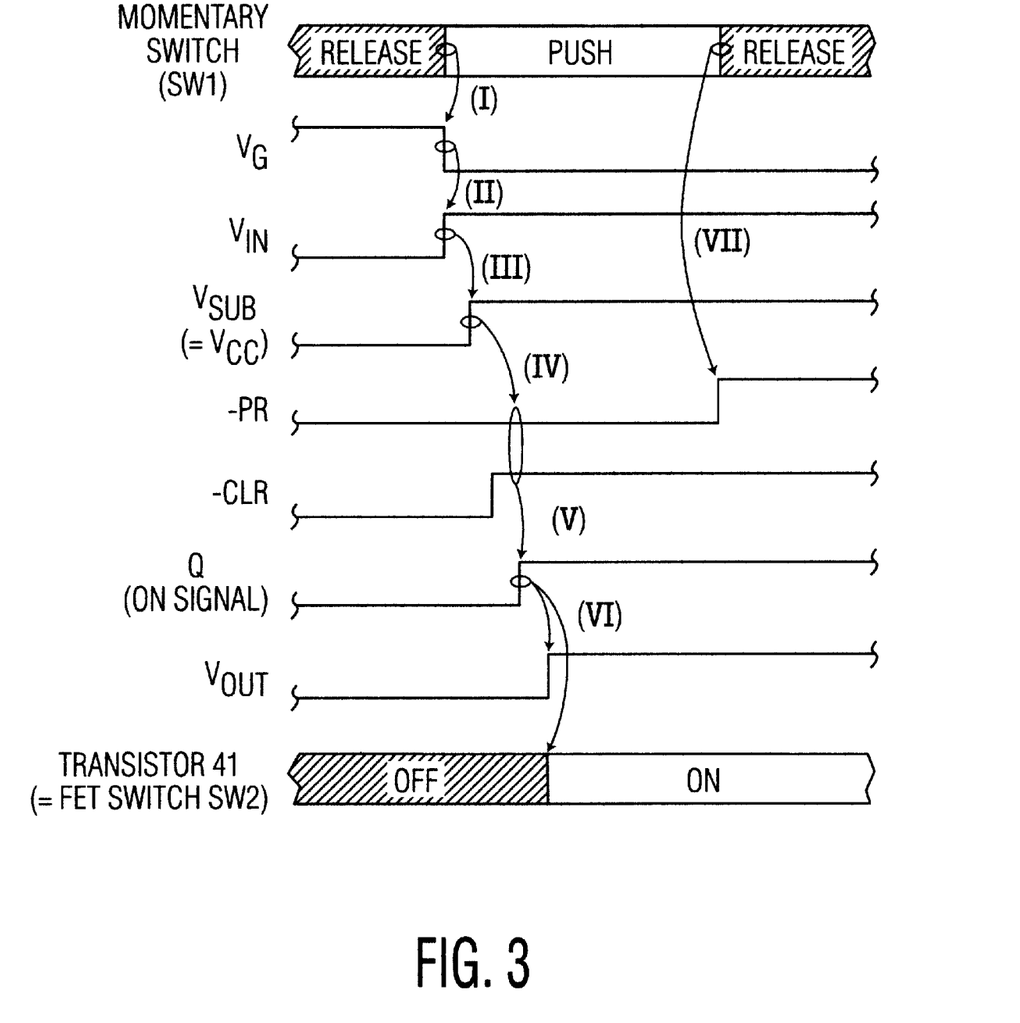
FIG. 3 shows a timing chart representing an operational characteristic of the power supply system of the present invention during a power on sequence.

The FIG. 3 shows the timing chart of the operation of the respective components of the power supply system.

When the user depresses or pushes the momentary switch SW1 in the power off state, i.e. the state that the switch SW2 is turned off, the ground potential, i.e. a low level voltage, is applied to the gate terminal $V_G$ of the P channel type FET switch SW2, so that the FET switch SW2 is turned on, as shown by an arrow I in the FIG. 3. At this time, the D flip flop 31 is not applied with the drive voltage $V_{CC}$, and hence it can not retain the ON state of the momentary switch SW1.

The turning on of the FET switch SW2 causes the voltage $V_{IN}$ to be applied to the three terminal type regulator 32, as shown by an arrow II in the FIG. 3, and after a relatively short delay, a stabilized sub power source voltage $V_{SUB}$ is outputted, as shown by an arrow III in the FIG. 3.

Since the control line 12 is pulled up by the voltage $V_{SUB}$, the clear terminal "-CLR" of the D flip flop 31 is applied with a high level voltage. Since the one end of the detect line 11 is connected to the ground potential by the momentary switch SW1, the preset terminal "−PR" of the D flip flop 31 is applied with the low level voltage, as shown by an arrow IV in the FIG. 3.

At this point of time, the D flip flop 31 has already switched to a condition that it can be driven by the application of the sub power source voltage $V_{SUB}$, it activates its own Q output in response to the switching of the clear terminal "−CLR" to the high level voltage, as shown by an arrow V in the FIG. 3.

Next, in response to the activation of the Q output, the DC/DC converter 50 is enabled to start the operation for converting the voltage, so that the power source voltage $V_{OUT}$ is applied to the various components of the system load 100. Also, the transistor 41 is turned on by the high level voltage applied to the base terminal. As a result, the gate terminal $V_G$ of the FET switch SW2 is connected to the ground potential through the transistor 41, as shown by an arrow VI in the FIG. 3.

After that, when the user stops the depression of the momentary switch SW1, the momentary switch SW1 returns its original position. Accordingly, the one end of the detect line 11 is disconnected from the ground potential, and it stays the pulled up state by the sub power source voltage $V_{SUB}$. As a result, the low level condition of the diode 42 is removed, and the preset terminal "−PR" of the D flip flop 31 is switched to the high level voltage, as shown by an arrow VII in the FIG. 3. However, since the D flip flop 31 has already latched the turn ON state of the momentary switch SW1, and keeps the activation state of the Q output, the turn ON state of the FET switch SW2, i.e. the power on state is ideally maintained.

It should be understood that, in the sequential operation described above, the latch circuit 30 is not applied with any power in the power off state, and hence the power is not consumed, and that the switch drive circuit 40 can turn the switch SW2 on without any drive voltage. According to the power supply system of the present invention, any leak current does not flow even if the PC having the internal battery 20 is not used during a long period. For example, even if the notebook PC having the internal battery is shipped, the power loss of the battery until the user opens the package is substantially ignored.

Power Off Operation

Figure 4:
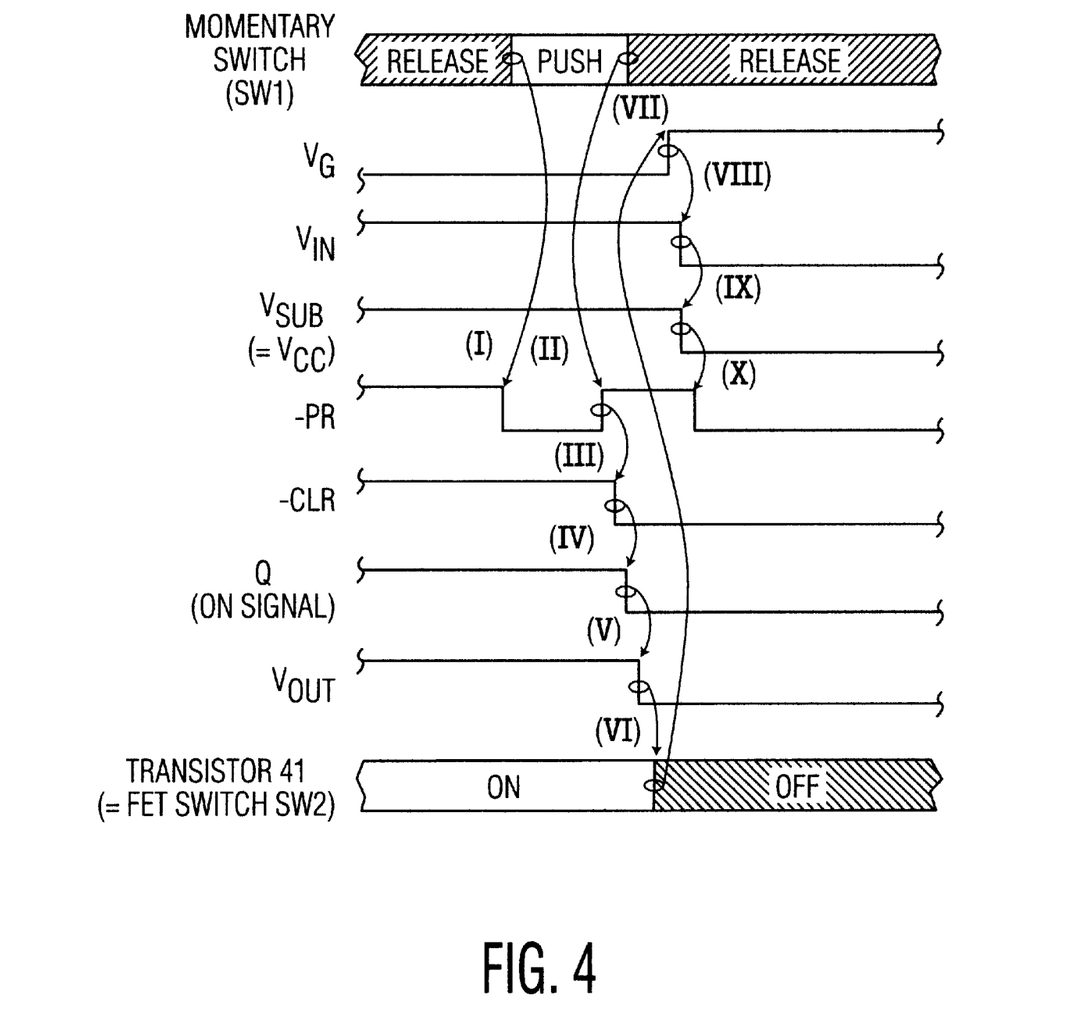
FIG. 4 shows a timing chart representing an operational characteristic of the power supply system of the present invention during a power off sequence.

The FIG. 4 shows the timing chart of the power off operation performed by the respective components of the power supply system.

When the user depresses or pushes the momentary switch SW1 in the power on state, i.e. the state that the switch SW2 is turned on, the one end of the detect line 11 is connected to the ground potential, and the low level voltage is applied to the preset terminal "−PR" of the D flip flop 31, as shown by an arrow I in the FIG. 4. Also, when the depress of the momentary switch SW1 is stopped, the end of the detect line 11 is disconnected from the ground potential, and the preset terminal "−PR" is returns to the high level voltage, as shown by an arrow II in the FIG. 4.

The power source controller 110 monitors the state of the momentary switch SW1 through the detect line 11 to execute the power off process (i.e. a close process) of the level of the firmware in response to the depress sequence which represents the power off of the system. (The detail of the process of the firmware level does not constitute the major part of the present invention, and hence it is not described.)

When the process of the firmware level is completed, the power source controller 110 deactivates its own output terminal OUT, i.e. the control line 12 to release or remove the power on state held by the latch circuit 30.

When the control line 12 is deactivated, the clear terminal "−CLR" of the D flip flop 31 is applied with the low level voltage, as shown by an arrow III in the FIG. 4, and in response to this condition, the Q output is deactivated, as shown by an arrow IV in the FIG. 4. In response to the deactivation of the Q output, the DC/DC converter 50 is disabled to stop the supply of the voltage $V_{OUT}$ to the system load 100, as shown by an arrow V in the FIG. 4, and the transistor 41 is turned off, as shown by an arrow VI in the FIG. 4.

When the transistor 41 is turned off, the gate voltage $V_G$ of the FET switch SW2 returns to the high level voltage, as shown by an arrow VII in the FIG. 4, and hence the FET switch SW2 is turned off. As a result, the supply voltage $V_{IN}$ to the three terminal type regulator 32 is shut off, as shown by an arrow VIII in the FIG. 4, and hence the sub power source voltage $V_{SUB}$ is naturally shut off, as shown by an arrow IX in the FIG. 4.

The shut off of the sub power source voltage $V_{SUB}$ causes the shut off of the drive voltage to the D flip flop 31, and the contents stored in the D flip flop 31 is lost. And, the charges on the detect line 11 are lost, and the preset terminal "−PR" switches to the low level voltage, as shown by an arrow X in the FIG. 4. As a result, the power is completely turned off.

C. Supplementary Description

Although a specific embodiment of the present invention has been disclosed, it will be understood by those having skill in the art that changes or modification in that specific embodiment can be made without departing from the spirit and the scope of the invention. The present invention can be applied to various electric and electronic apparatus, such as a facsimile apparatus, various wireless apparatus, such as a movable wireless terminal, a wireless telephone, an electronic diary, a video camera, and the other battery operated apparatus, such as a word processor. In summary, the present invention has disclosed using a particular example, and hence the invention should not be limitedly construed. To determine the scope of the invention, the claims should be referred.

As described hereinbefore, the present invention can provide an electronic apparatus and a power supply unit used into the electronic apparatus which realize a remote power on/off scheme using the momentary switch without a leak of current at a power off state. By using the present invention into a notebook PC, for example, it is possible to eliminate the damage of the battery and to realize the instant on scheme.

What is claimed is:

1. A power supply unit for an electronic apparatus comprising:

a main power line connecting a main power source with said electronic apparatus;

a remotely controlled switch in said main power line for interrupting power flow along said main power line to said electronic apparatus in an off state and for passing power along said main power line to said electronic apparatus in an on state;

a momentary switch provided on said electronic apparatus for manual control of said remotely controlled switch;

a switch driving circuit responsive to manual activation of said momentary switch when said remotely controlled switch is in said off state for switching said remotely controlled switch to said on state without driving voltage being supplied to said switch driving circuit;

a latch circuit powered from a circuit node that receives power only when said remotely controlled switch is in said on state, said latch circuit being responsive to power being supplied from said circuit node for keeping said remotely controlled switch in said on state when said momentary switch thereafter no longer is manually activated; and a power supply controller responsive to manual activation of said momentary switch when said remotely controlled switch is in said on state for releasing said latch circuit from keeping said remotely controlled switch in said on state, said remotely controlled switch switching to said off state when said momentary switch thereafter no longer is manually activated, said power supply controller being powered only when said remotely controlled switch is in said on state.

2. A power supply unit as in claim 1 wherein said main power source is a battery, said remotely controlled switch is a P channel type FET switch and said switch driving circuit switches said P channel type FET switch to said on state by connecting a gate terminal of said P channel type FET switch to a ground potential.

3. A power supply unit as in claim 2, wherein said battery is detachably and exchangeably accommodated into said electronic apparatus.

4. An electronic apparatus comprising:

a housing;

a main power source;

a DC/DC converter for converting a voltage level of said main power source;

a system load driven by an output of said DC/DC converter;

a main power line for applying an output current of said main power source to said DC/DC converter;

a remotely controlled switch in said main power line for interrupting power flow along said main power line to said electronic apparatus in an off state and for passing power along said main power line to said electronic apparatus in an on state;

a momentary switch provided on said electronic apparatus for manual control of said remotely controlled switch;

a switch drive circuit responsive to manual activation of said momentary switch when said remotely controlled switch is in said off state for switching said remotely controlled switch to said on state without driving voltage being supplied to said switch driving circuit;

a latch circuit powered from a circuit node that receives power only when said remotely controlled switch is in said on state, said latch circuit being responsive to power being supplied from said circuit node for keeping said remotely controlled switch in said on state when said momentary switch thereafter no longer is manually activated; and a power supply controller responsive to manual activation of said momentary switch when said remotely controlled switch is in said on state for releasing said latch circuit from keeping said remotely controlled switch in said on state, said remotely controlled switch switching to said off state when said momentary switch thereafter no longer is manually activated, said power supply controller being powered only when said remotely controlled switch is in said on state.

5. An electronic apparatus as in claim 4 wherein said main power source is a battery, said remotely controlled switch is a P channel type FET switch and said switch driving circuit switches said P channel type FET switch to said on state by connecting a gate terminal of said P channel type FET switch to a ground potential.

6. An electronic apparatus as in claim 5, wherein said battry is detachably and exchangebly accommodated into said electronic apparatus.

* * * * *